United States Patent
Wenzelburger et al.

(10) Patent No.: US 9,358,620 B2
(45) Date of Patent: Jun. 7, 2016

(54) GUIDE PAD

(75) Inventors: Karl-Heinz Wenzelburger, Riederich (DE); Juergen Wenzelburger, Metzingen (DE)

(73) Assignee: Botek Praezisionsbohrtechnik GmbH, Riederich (DE)

( * ) Notice: Subject to any disclaimer, the term of this patent is extended or adjusted under 35 U.S.C. 154(b) by 281 days.

(21) Appl. No.: 13/582,488

(22) PCT Filed: Mar. 3, 2011

(86) PCT No.: PCT/DE2011/000218
§ 371 (c)(1),
(2), (4) Date: Oct. 5, 2012

(87) PCT Pub. No.: WO2011/107081
PCT Pub. Date: Sep. 9, 2011

(65) Prior Publication Data
US 2013/0051944 A1    Feb. 28, 2013

(30) Foreign Application Priority Data
Mar. 5, 2010    (DE) ............ 20 2010 003 288 U

(51) Int. Cl.
*B23B 41/02*    (2006.01)
*B23B 51/04*    (2006.01)

(52) U.S. Cl.
CPC ........ *B23B 51/0486* (2013.01); *B23B 2229/04* (2013.01); *B23B 2251/422* (2013.01); *B23B 2251/56* (2013.01); *B23B 2270/34* (2013.01); *Y10T 408/5586* (2015.01)

(58) Field of Classification Search
CPC ............ B23B 2251/56; B23B 51/0493; B23B 51/0486; B23B 2229/04; B23B 2270/34; B23B 51/0054; B23B 2251/422; Y10T 408/5586
USPC ......... 408/79, 80, 81, 82, 83, 56, 57
See application file for complete search history.

(56) References Cited

U.S. PATENT DOCUMENTS

| 6,602,028 B1 | 8/2003 | Lindblom et al. |
| 2005/0025928 A1 | 2/2005 | Annanolli et al. |
| 2010/0054879 A1 | 3/2010 | Nedzlek |

FOREIGN PATENT DOCUMENTS

| CH | 652 631 | 11/1985 |
| DE | 600 14 923 | 3/2005 |
| DE | 20 2009 003 645 | 7/2009 |
| JP | 01-106115 | 7/1989 |
| JP | 2004-066391 | 3/2004 |

OTHER PUBLICATIONS

International Search Report of PCT/DE2011/000218, Jun. 20, 2011.
English translation of International Preliminary Report on Patentability of PCT/DE2011/000218 dated Sep. 25, 2012 and Written Opinion of the International Searching Authority.

*Primary Examiner* — Eric A Gates
*Assistant Examiner* — Paul M Janeski
(74) *Attorney, Agent, or Firm* — Collard & Roe, P.C.

(57) ABSTRACT

A guide gib (500) for a deep drilling tool of a substantially rectangular shape with a longitudinal direction (L) and a width (B) and with at least one sliding surface (540) is characterized in that at least one lubricating groove, preferably a plurality of lubricating grooves (501, 502), is/are arranged at least in the region of a contact zone of the sliding surface.

2 Claims, 9 Drawing Sheets

GUIDE PAD

CROSS REFERENCE TO RELATED APPLICATIONS

This application is the National Stage of PCT/DE2011/000218 filed on Mar. 3, 2011, which claims priority under 35 U.S.C. §119 of German Application No. 20 2010 003 288.1 filed on Mar. 5, 2010, the disclosure of which is incorporated by reference. The international application under PCT article 21(2) was not published in English.

PRIOR ART

The invention relates to a guide pad.

Guide pads are fastened in a seat on a drilling head of a deep drilling tool. The fastening can be performed in a removable or replaceable manner (e.g., by screws) or also in a materially bonded manner (e.g., by soldering or gluing). A guide pad has at least one sliding surface, which is provided for the purpose of interacting with the borehole wall. The most typical systems in deep drilling are the single-flute gundrill system, the so-called BTA system (BTA=boring and trepanning association), also called the STS system (STS=single tube system), and the ejector system. VDI guideline VDI3210 gives an overview.

In these deep drilling systems, a coolant lubricant is typically used, in order to lubricate and cool cutters and guide pads, on the one hand, and to flush the chips arising during the machining out of the borehole, on the other hand. Deep drilling tools are primarily used to produce boreholes having a large drilling depth in relation to the drilling diameter. Typical values for the drilling depth are in the range of 10 times to 100 times the drilling diameter, but may also be greater or less than this.

In deep drilling tools, guide pads are used for the purpose of supporting the resulting cutting forces against the borehole wall and guiding the deep drilling tool in the borehole. Therefore, boreholes can be produced which are distinguished by particularly good linearity. In addition, the borehole surface is smoothed by the guide pads sliding thereon.

Guide pads are typically produced from carbide. They can also be produced from other wear-resistant materials such as ceramic or CBN or other materials suitable for this purpose.

Guide pads are also known which consist of a steel body, in which elements made of wear-resistant material are fastened, which then in turn come into contact with the borehole wall. In addition, guide pads exist whose sliding surface is divided into multiple regions, between which depressions can be arranged.

Guide pads slide over the borehole wall during the drilling procedure. Only a part of their sliding surface typically presses against the borehole wall. In the event of inadequate cooling and/or lubrication by the coolant lubricant, the friction between guide pad and borehole wall can be very high in this contact zone, whereby very high temperatures can occur.

A generally known problem, which is caused by the high temperatures, is cracking in the guide pads. This predominantly occurs in guide pads made of carbide. The cracks arising at high temperatures can extend further and further in the event of progressive strain. Breakouts or a fracture of the guide pad can thus occur, whereby the borehole surface can be damaged. This damage can have the result that the workpiece must be reworked or is no longer usable. Cracking occurring on the guide pads is therefore undesirable and is to be avoided as much as possible.

A guide pad is disclosed in DE 600 14 923 T2, which has a planar indentation or depression in the region of the sliding surfaces, whose extension encloses an angle of 55°+10° with the longitudinal direction of the guide pad. This indentation is implemented comparatively wide and deep in relation to the dimensions of the guide pad and is to allow the coolant lubricant to be able to flow through this indentation. Particularly good cooling of the sliding surface or contact surface is thus to be achieved, whereby the cracking is to be reduced.

The indentation in this known guide pad is implemented as comparatively wide, the sliding surfaces are arranged on the edges. This implementation does allow optimum coolant passage, however, sufficient lubrication in the region of the contact surfaces is not ensured to the full extent. Specifically, the coolant lubricant is only supplied along the lateral delimitation surfaces in this case. However, coolant lubricant can only reach the contact surfaces themselves with difficulty.

The invention is based on the object of providing a guide pad, by which substantially improved lubrication is achieved in the region of the contact surfaces and in particular in the region of the contact zones which are in contact with the borehole wall, so that the danger of cracking is reduced and the service life of the guide pad is thus lengthened. B2

This object is achieved by the features described herein.

SUMMARY OF THE INVENTION

The basic idea of the invention is to arrange depressions or lubricating channels in a guide pad on its sliding surface, so that substantially better lubrication is ensured on the contact zone between guide pad and borehole wall.

Through the arrangement of the lubrication channels directly in the sliding surface, a significantly longer service life is reached than in known guide pads. It could be established in experiments that the service life of guide pads according to the invention can be more than twice the service life of known guide pads.

The improvement is achieved by the arrangement of lubricating grooves in the sliding surface of the guide pads, whose extension in width and depth is small compared to the width and thickness of the guide pad. Coolant lubricant can be supplied along these lubricating grooves to various points of the sliding surface or the coolant lubricant can collect in such lubricating grooves and therefore contribute to the lubrication, while in contrast in known guide pads, coolant lubricant can only enter and be guided to the contact zone on the lateral delimitation surfaces.

Advantageous designs and embodiments are the subject matter of the subclaims which refer back to Claim 1. It is thus provided according to one advantageous embodiment that the lubricating grooves have an angle of less than or equal to 45° or greater than 75° to the longitudinal direction. On the basis of experiments which have been performed, an arrangement of multiple parallel lubricating grooves at an angle of both approximately 90° and also parallel to the longitudinal extension of the guide pad has proven to be particularly advantageous. Furthermore, improvements could also be achieved using lubricating grooves which were arranged at an angle of approximately 30° to the longitudinal direction of the guide pad. Solely in principle, the lubricating grooves can be arranged in greatly varying ways in the guide pads. An advantageous embodiment provides that the lubricating grooves open into the delimitation surfaces, which delimits or restrict the guide pads both in their width and also in their length. A continuous coolant lubricant supply is thus ensured. Yet another embodiment provides that the lubricating grooves are implemented as closed pockets, i.e., are delimited with respect to their length and width in the region of the sliding surface of the guide pad. The pocket-shaped implementation of the lubricating grooves has the advantage of forming a reservoir for the coolant lubricant. It can be provided that the length and width of the lubricating grooves substantially correspond, so that the pocket-shaped lubricating grooves have a square footprint. In addition, circular or oval footprints can also be provided. Such an implementation of the lubricating grooves is advantageous in particular from production aspects.

With respect to optimum lubrication, lubricating grooves whose width is small in comparison to the width of the guide pad are advantageous. Lubricating grooves whose width corresponds to at most one-fifth of the width of the guide pad have proven to be advantageous in this case.

Solely in principle, the lubricating grooves themselves can have greatly varying forms. In addition to a polygonal form, a curved form or any arbitrary irregular form can also be provided. Combinations of these forms are also possible.

The lubricating grooves themselves only have a small depth. A depth of the lubricating grooves which is between 0.1 mm and 1.5 mm has proven to be advantageous.

To increase the lifetime of the guide pads, it is provided that they consist at least partially of carbide. In addition, it can also be provided that the guide pads are coated with a hard material layer.

DRAWINGS

Exemplary embodiments of the invention are shown in the drawing and are explained in greater detail in the following description.

DESCRIPTION OF EXEMPLARY EMBODIMENTS

Figure 1A:
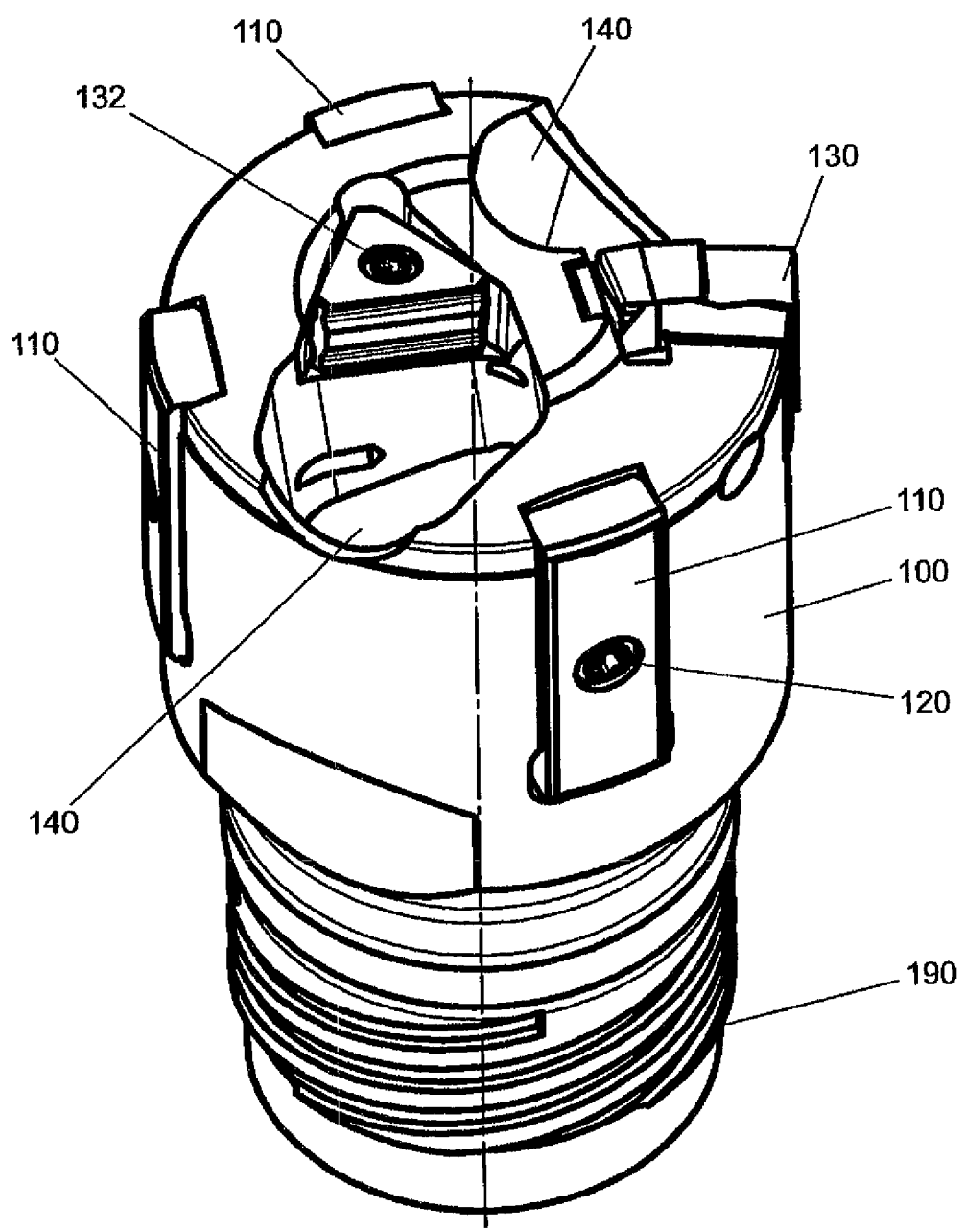
FIG. 1a shows a drilling head of the BTA drilling system having three replaceably fastened guide pads.

FIG. 1a shows an isometric view of a drilling head 100 for the so-called BTA drilling system, which is equipped with three replaceably fastened guide pads 110 according to the invention. The guide pads 110 are fastened on the drilling head 100 using screws 120, so that they can be turned over or replaced with new guide pads 110 after reaching their service life. The service life of the drilling head 100 can be a multiple of the service life of the guide pads 110.

Furthermore, two cutting plates 130, 132, which are replaceably fastened using screws, are arranged on the drilling head 100. The drilling head 100 has two openings 140, which are connected to an inner channel. The chips arising during the drilling are discharged via these openings 140 and the inner channel. At one end, the drilling head 100 is provided with a receptacle 190, using which it is connected to a drilling rod (not shown) in a way known per se. Both the number and arrangement of the cutting plates 130, 132 and also the openings 140 and channels and the design of the receptacle 190 for the drilling rod are unimportant for the present invention.

Figure 1B:
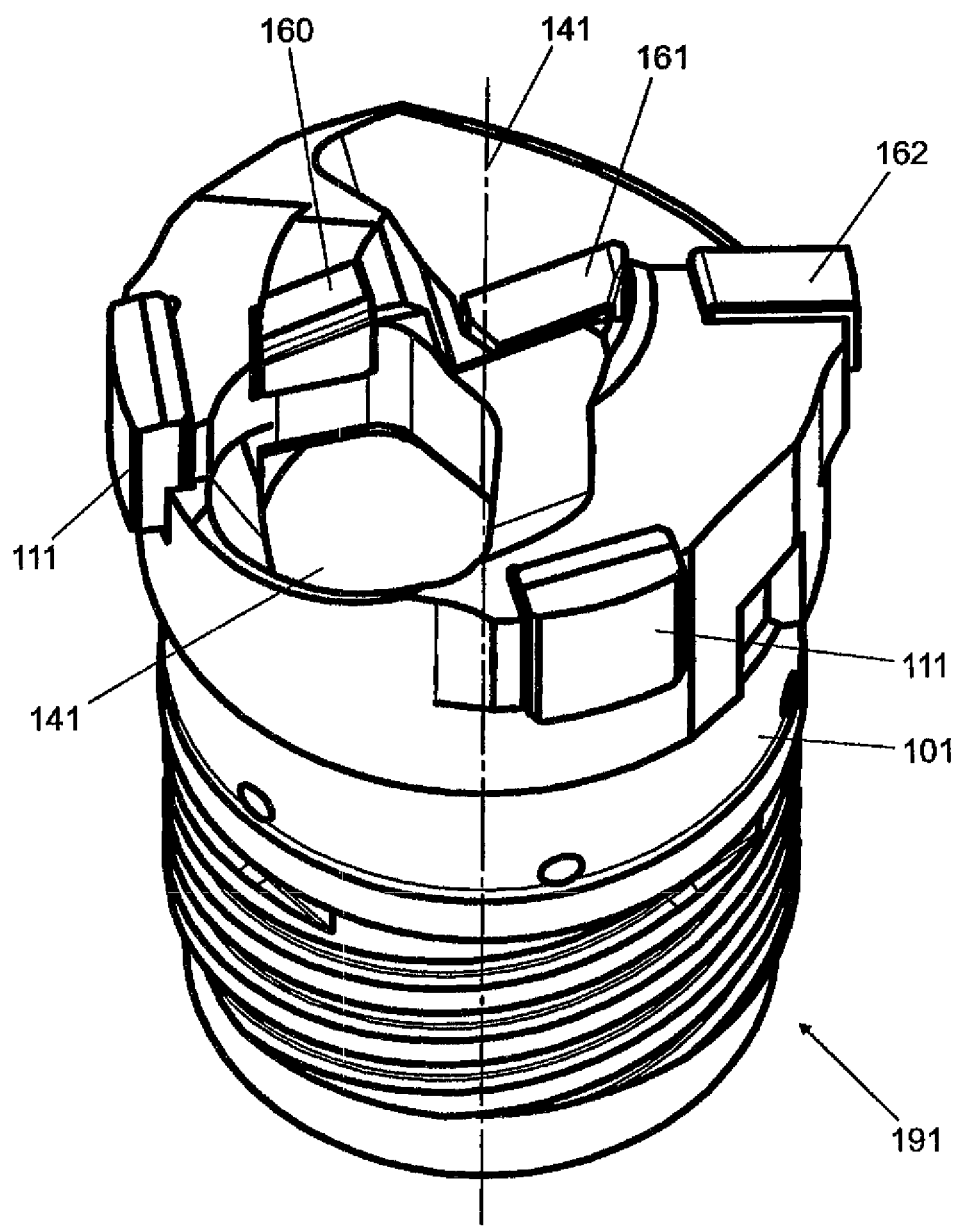
FIG. 1b shows a drilling head of the ejector drilling system having two materially bonded guide pads.

FIG. 1b shows an isometric view of a drilling head 101 for the ejector drilling system, which is equipped with two materially bonded guide pads 111. Furthermore, three materially bonded cutting plates 160, 161, 162 are arranged on the drilling head 101. The service life of such a drilling head 101 is typically reached when either the guide pads 111 or the cutting plates 160, 161, 162 have reached the end of their service life. The drilling head 101 has two openings 141, which are connected to an inner channel. The chips arising during the drilling are discharged via these openings 141 and the inner channel. At one end, the drilling head 101 is provided with a receptacle 191, by means of which it is connected to a drilling rod (not shown). Both the number and arrangement of the cutting plates 160, 161, 162 and of the openings and channels and also the design of the receptacle 191 for the drilling rod are unimportant to the present invention.

Figure 2:
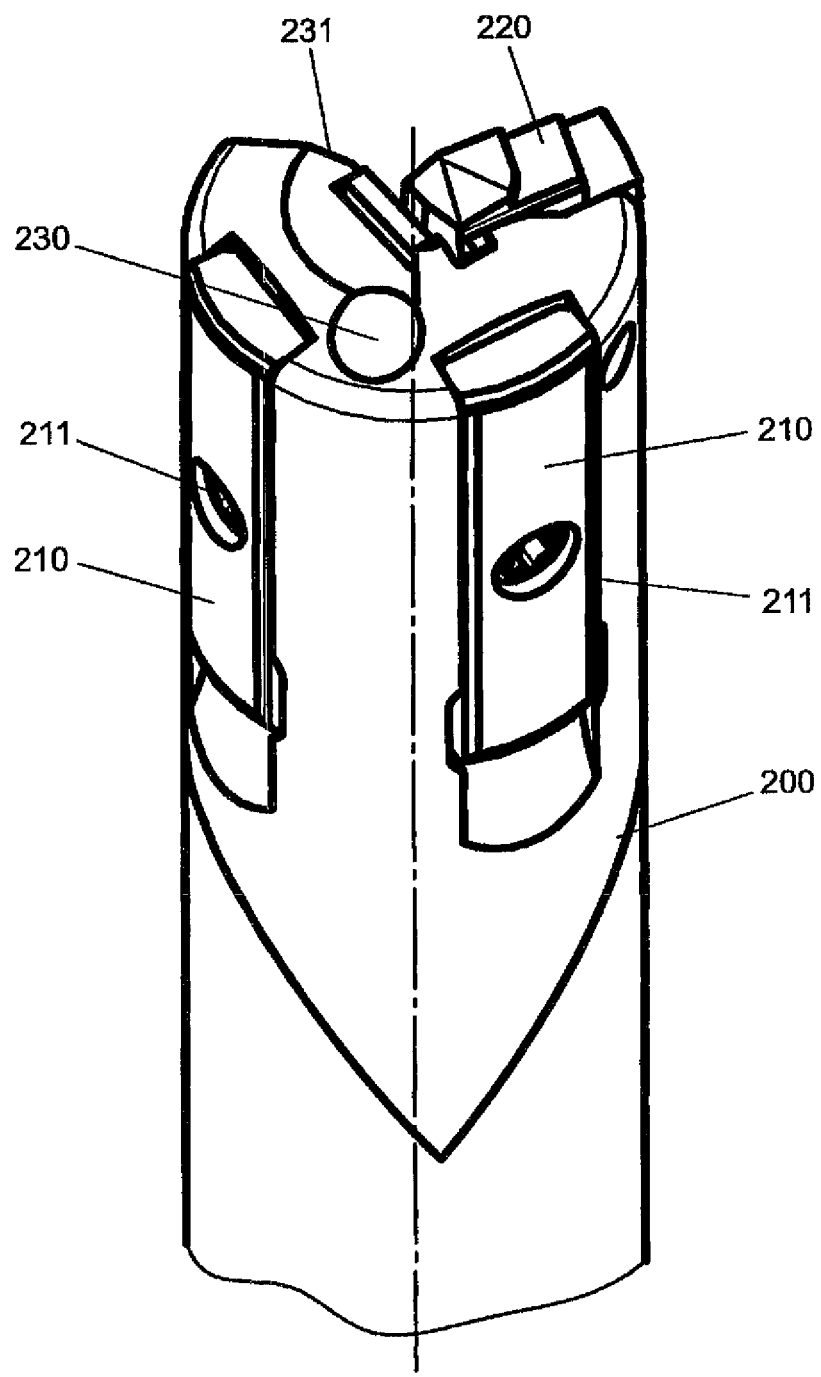
FIG. 2 shows a drilling head of a single-flute gundrill having two replaceably fastened guide pads.

FIG. 2 shows an isometric view of a drilling head 200 of a single-flute gundrill, which is equipped with two replaceably fastened guide pads 210. The guide pads 210 are fastened using screws 211.

In addition, the drilling head 200 is equipped with a cutting plate 220, which is replaceably fastened by means of a screw. In addition, it has an internal channel 230 for the supply of coolant lubricant and an external groove 231 for the discharge of the chips arising during the drilling and the coolant lubricant. The number and arrangement of the cutting plates 210 and the arrangement of the channel or channels are unimportant for the present invention.

Figure 3A:
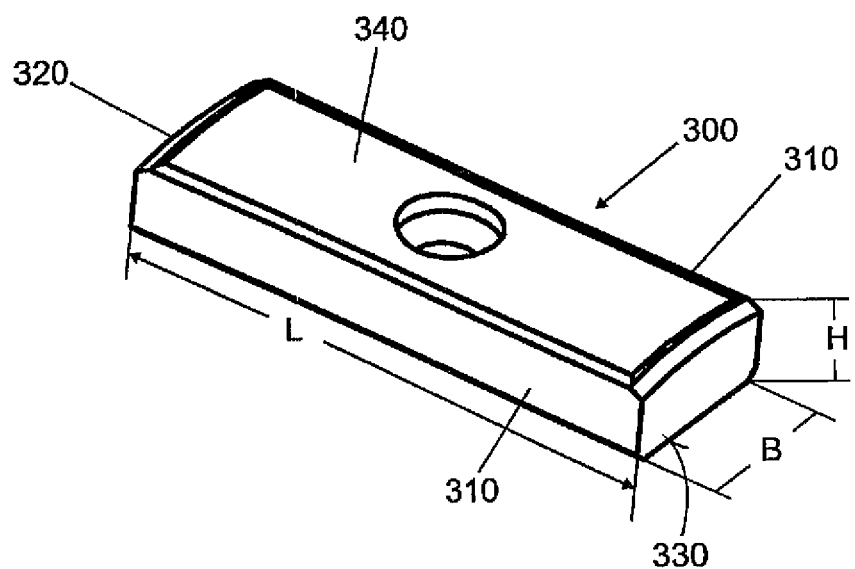
FIG. 3a shows a guide pad according to the prior art.

FIG. 3a shows an isometric view of a guide pad 300 according to the prior art. The guide pad 300 typically has two planar lateral surfaces 320, which delimit the longitudinal extension L, two planar lateral surfaces 310, which delimit the width B, and a planar base surface 330 as well as a curved sliding surface 340, which delimit the thickness H of the guide pad 300. The guide pad 300 presses against a corresponding seat in the drilling head using the base surface 330 and the lateral surfaces 310, 320, whereby the location of the guide pad 300 in the drilling head is defined. The curvature of the sliding surface 340 is advantageously implemented so that its radius of curvature is less than or approximately equal to the radius of the borehole to be generated. The axis of curvature of the sliding surface is preferably aligned approximately parallel to the axis of rotation of the drilling head, which extends substantially parallel to the longitudinal sides 310 and the base surface 330.

Figure 3B:
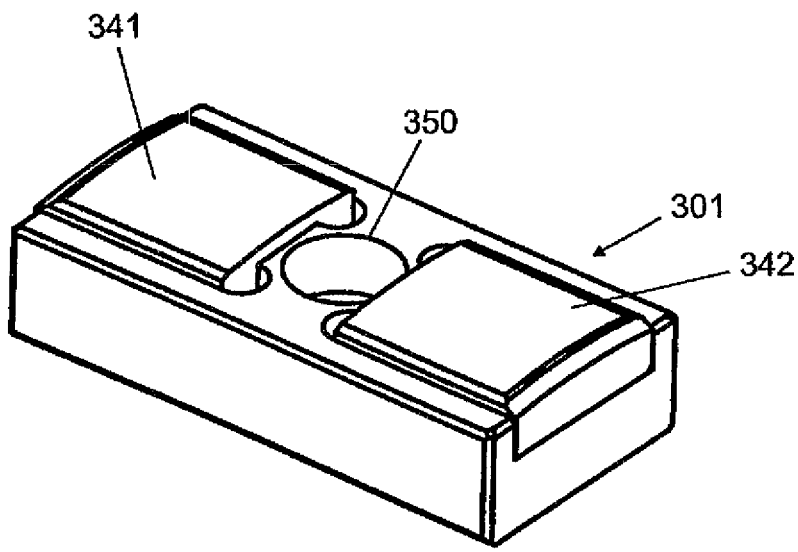
FIG. 3b shows a further guide pad according to the prior art in a multipart embodiment and having an indentation between the sliding surfaces.

FIG. 3b shows an isometric view of a further typical guide pad according to the prior art. This guide pad 301 corresponds to that of FIG. 3a, with the difference that the guide pad 301 is constructed from multiple parts which are connected to one another. Such guide pads are preferably constructed from a first part made of a first cost-effective material, for example, steel, and at least one further part made of wear-resistant material, for example, carbide, which are connected to one another by means of a material bonding connection method, for example, by soldering. The guide pad shown in the figure has two sliding surfaces 341, 342, between which a depression 350 is arranged. The sliding surfaces 341, 342 are formed by the wear-resistant material. The statement made above in conjunction with FIG. 3a applies accordingly for the curvature of the sliding surfaces 341, 342.

Figure 4:
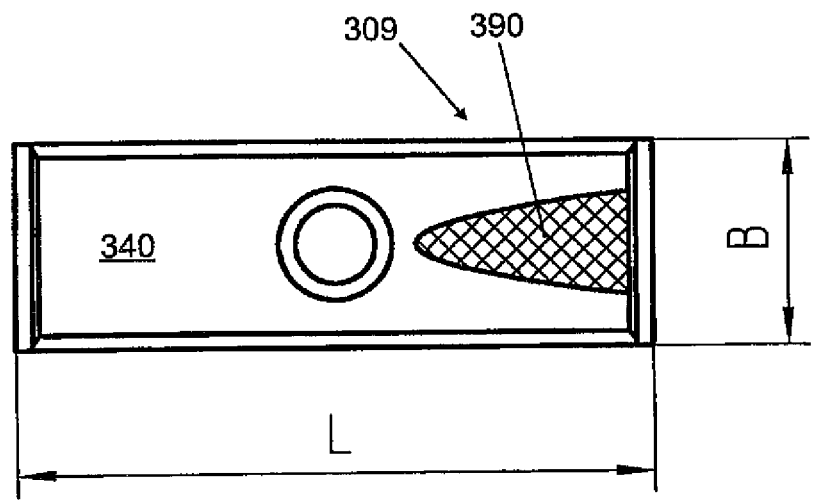
FIG. 4 shows the typical contact zone of a guide pad according to the prior art.

FIG. 4 shows a top view of the sliding surface 340 of the guide pad 300 shown in FIG. 3a. The typical contact zone 390 on the sliding surface 340 of a guide pad 300, on which wear typically occurs during drilling using deep hole drills, is shown shaded. This contact zone 390 corresponds to the part of the sliding surface 340 of the guide pad 300 which is actually in contact with the borehole wall (not shown). In this region, wear occurs through friction between sliding surface 340 and borehole wall, i.e., a material erosion on the guide pad 300. The guide pad 300 presses directly against the borehole wall in the contact zone 390, whereby only very little coolant lubricant can reach between contact zone 390 and borehole wall. With increasing wear, the area of the contact zone 390 becomes larger and cracks can form in this zone, which are caused by sustained action of heat.

Wear typically only occurs on one side on guide pads, so that the guide pads can be turned over by 180° and used again.

Guide pads known from the prior art are typically produced from a wear-resistant material at least in the region at which they are in contact with the borehole wall. Widespread materials for this purpose are, for example, carbide, ceramic, or CBN. To further lengthen the service life, it can also be provided that at least one of the sliding surface(s) of a guide pad is coated with a hard material layer, which both reduces the occurrence of wear and the transmission of heat into the guide pad and also decreases the friction between sliding surface and borehole wall.

Figure 5:
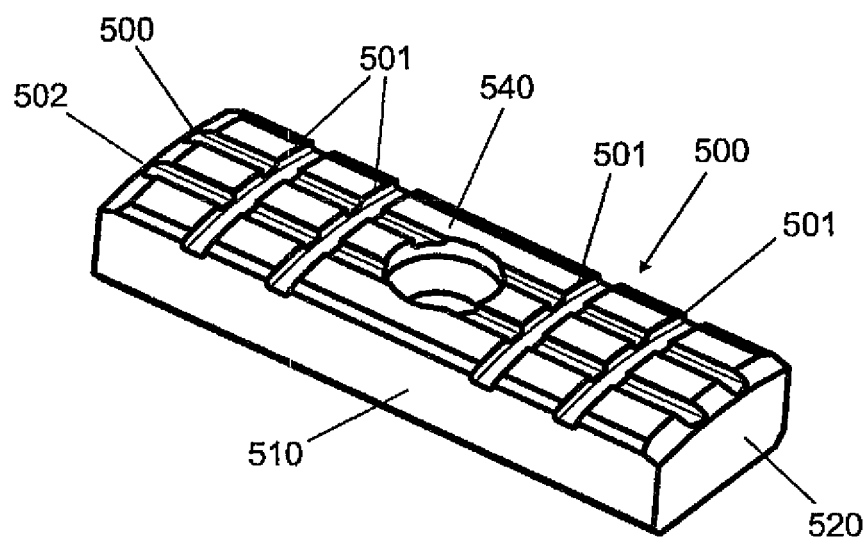
FIG. 5 shows an exemplary embodiment of a guide pad according to the invention having multiple lubricating grooves extending longitudinally and transversely.

FIG. 5 shows an isometric view of a guide pad 500 according to the invention having identical construction as the guide pads shown in FIGS. 3a and 4. As can be inferred from FIG. 5, multiple lubricating grooves 501, 502 are arranged along the sliding surface 540 of the guide pads 500, which extend parallel to the lateral delimitation surfaces 510, 520 of the sliding surface 540 and open therein.

Figure 6:
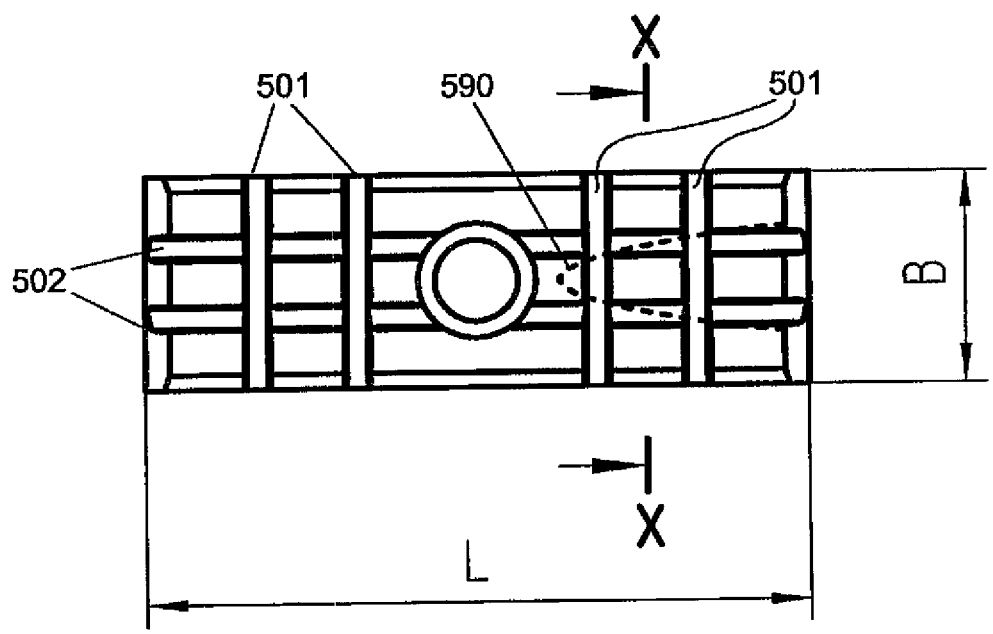
FIG. 6 shows a top view of the guide pad shown in FIG. 5.

FIG. 6 shows a top view of the sliding surface of the guide pad shown in FIG. 5. The typical contact zone 590 is illustrated as a dashed line. The lubricating grooves 501, 502 are arranged in the region of the contact zone 590. During drilling, coolant lubricant can reach the contact zone 590 along the lubricating grooves 501, 502, which are also connected to one another, whereby significantly improved lubrication is achieved between contact zone 590 and borehole wall. The friction between guide pad 500 and borehole wall in the contact zone 590 is thus significantly reduced. It has been ascertained in experiments that through this arrangement of lubricating grooves 501, 502, both cracking and also the wear in relation to guide pads without lubricating grooves are significantly reduced. Such guide pads thus have a significantly longer service life than guide pads known from the prior art.

In contrast to the guide pad known from DE 600 14 923 T2, the lubricating channels provided here are not arranged between the sliding surfaces, but rather cross them, to ensure better lubrication in the contact zone 590. In the guide pads known from DE 600 14 923 T2, cooling of the guide pad is achieved by arranging an indentation between the sliding surfaces through the coolant lubricant flowing through the indentation. In contrast, in the guide pad shown in FIG. 5 and FIG. 6, the lubricating channels 501, 502 are arranged so that they more or less cross the contact zone and therefore result in improved lubrication in the contact zone 590. In addition, the extension of the lubricating channels 501, 502 is very small in comparison to those known from the prior art, since even small quantities of coolant lubricant are sufficient to improve the lubrication, while in contrast significantly larger quantities of coolant lubricant are required for cooling.

Figure 7:
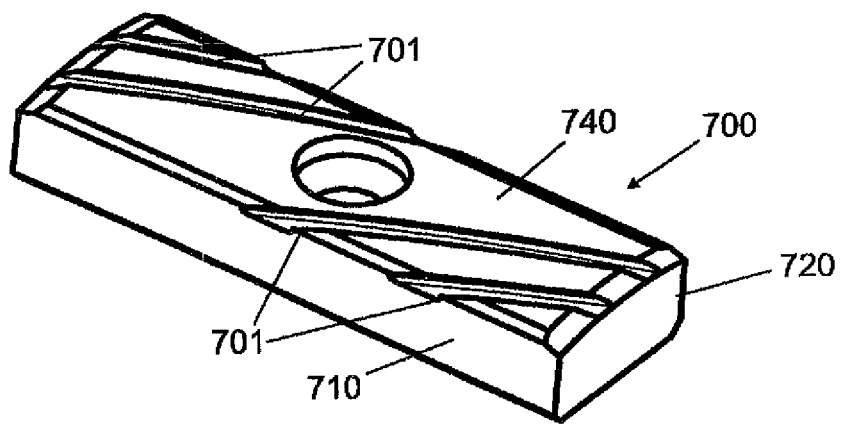
FIG. 7 shows an exemplary embodiment of a guide pad according to the invention having multiple diagonally extending lubricating grooves.

FIG. 7 shows an isometric view of a further guide pad 700 having identical construction as that shown in FIGS. 3a and 4. Multiple lubricating grooves 701 are arranged here along the sliding surface 740 of the guide pad 700, which extend at an angle to the lateral delimitation surfaces 710, 720 along the sliding surface 740 and open into the delimitation surfaces 710, 720.

Figure 8:
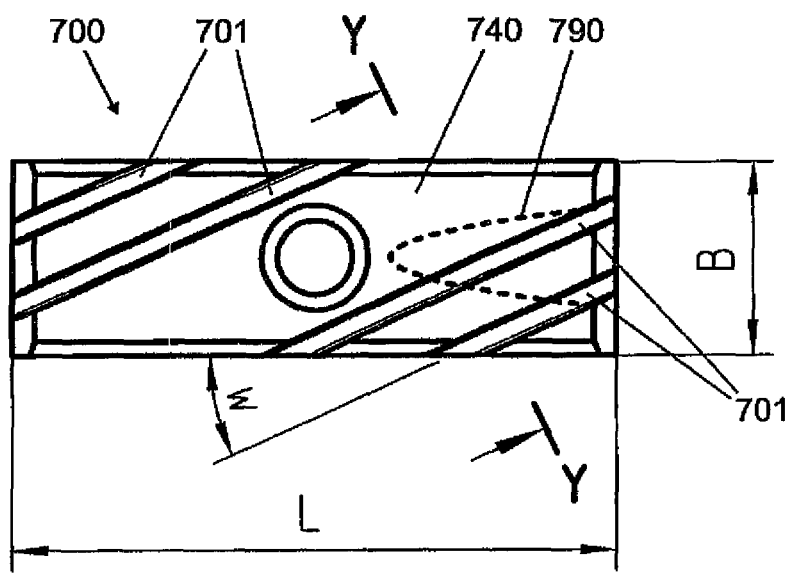
FIG. 8 shows a top view of the guide pad shown in FIG. 7.

FIG. 8 shows a top view of the sliding surface 740 of the guide pad 700 shown in FIG. 7. The lubricating grooves 701 are arranged at an angle w to the lateral delimitation surfaces 710, 720. The contact zone 790 is shown as a dashed line. The lubricating grooves 701 allow optimum lubrication in the region of the contact zone 790.

Figure 9:
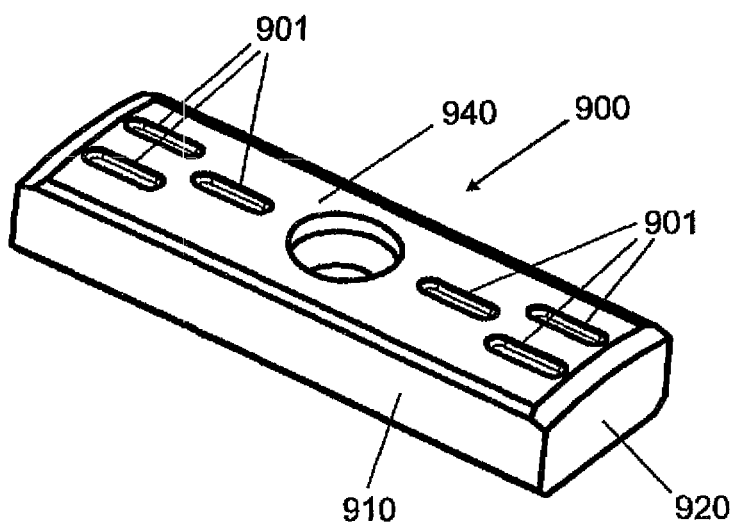
FIG. 9 shows an exemplary embodiment of a guide pad according to the invention having multiple pocket-like closed lubricating grooves.

FIG. 9 shows an isometric view of a further guide pad 900 having identical construction as that shown in FIGS. 3a and 4. Multiple pocket-like lubricating grooves 901 are arranged in the sliding surface 940 of the guide pad 900, which extend along the sliding surface 940. In contrast to the embodiments shown in FIG. 5 to FIG. 8, the lubricating grooves 901 do not open into the lateral delimitation surfaces 910, 920, however, but rather are restricted in their extension solely to the sliding surface 940. This embodiment of the lubricating grooves 901 acts as a reservoir, in which coolant lubricant can collect, so that a small quantity of coolant lubricant is always present, which can contribute to the lubrication in the contact zone 990.

Figure 10:
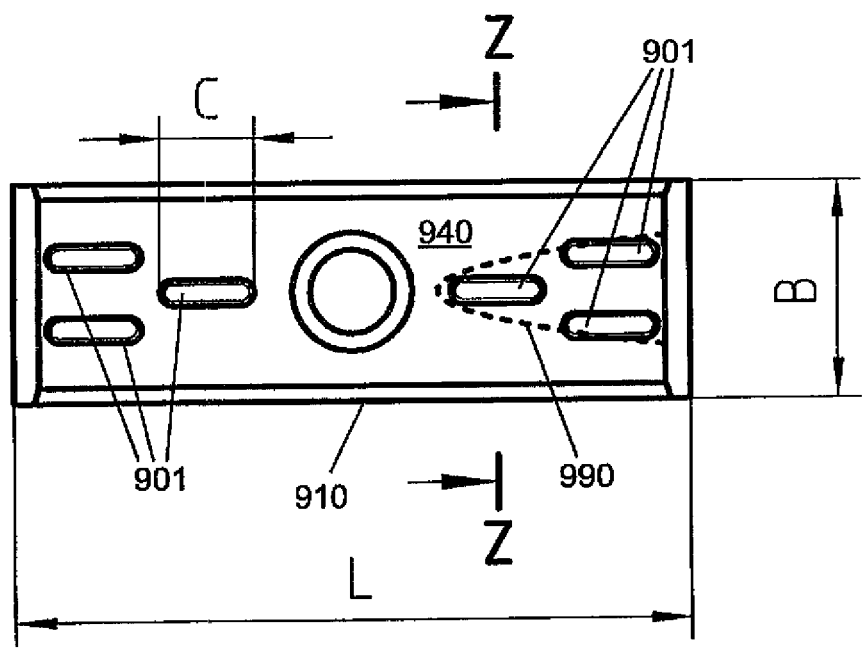
FIG. 10 shows a top view of the guide pad shown in FIG. 9.

FIG. 10 shows a top view of the sliding surface 940 of the guide pad 900 shown in FIG. 9. The contact zone 990 is shown as a dashed line. The length of a lubricating groove 901 is designated by C. In principle, the length of each lubricating groove 901 can differ from the length of the other lubricating grooves 901.

Further embodiments of lubricating grooves can have, for example, a curved or polygonal extension in the top view on the guide pad. The object of the present invention is not the embodiment of the lubricating grooves themselves, however, but rather the arrangement of the lubricating grooves in the region of the contact zone between guide pad and borehole wall. The illustration of the lubricating grooves shown in FIG. 5 to FIG. 10 is not to be understood as restrictive for this reason. Solely in principle, arbitrary embodiments and designs of the lubricating grooves can be provided per se, these lubricating grooves always being arranged in the region of the contact zone and having small extensions in comparison to the delimitation surfaces and to the height or thickness of the guide pads.

Figure 11:
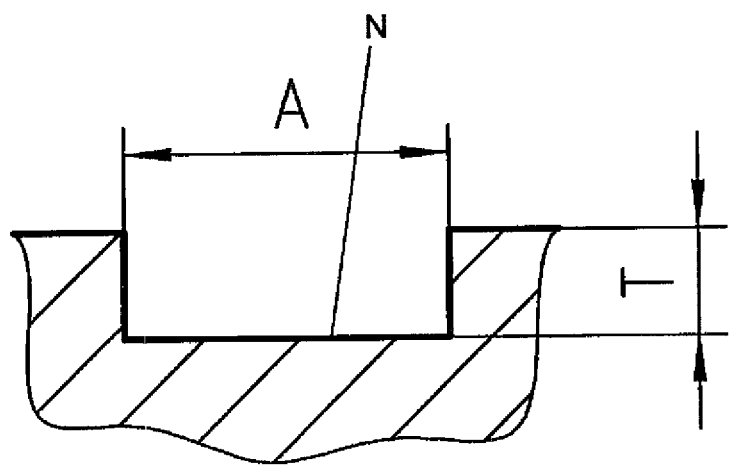
FIG. 11 shows a cross section of an embodiment of a lubricating groove of a guide pad according to the invention.
Figure 12:
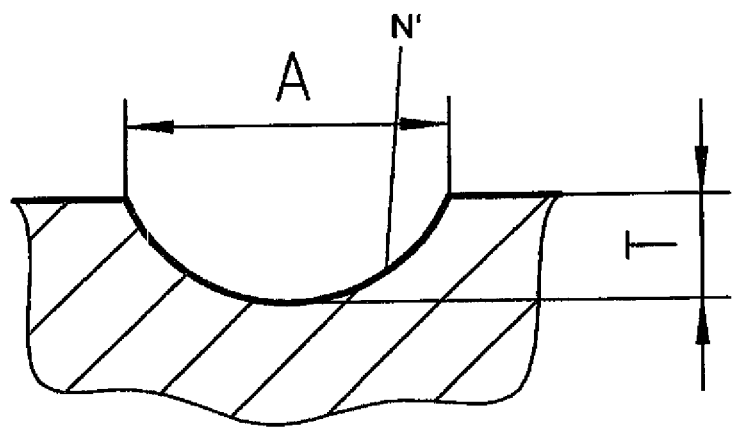
FIG. 12 shows a cross section of a further embodiment of a lubricating groove of a guide pad according to the invention.
Figure 13:
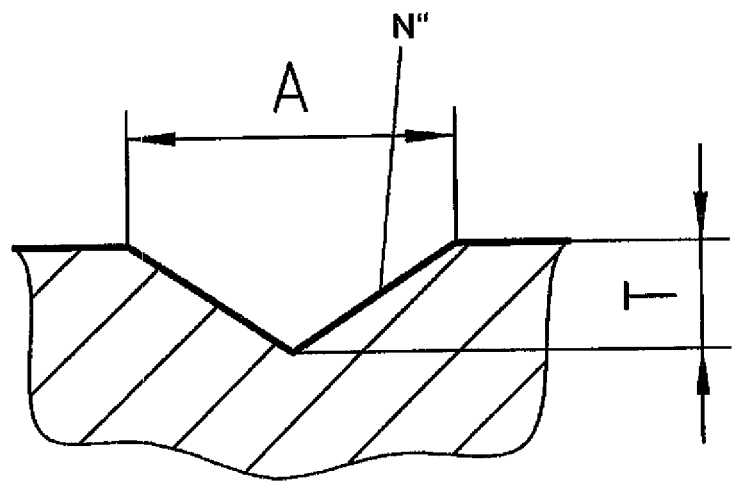
FIG. 13 shows a cross section of a further embodiment of a lubricating group of a guide pad according to the invention.

FIGS. 11 to 13 show various preferred embodiments for the cross section of the lubricating grooves. The illustrated embodiments relate to the cross sections shown in FIG. 6 by X-X, in FIG. 8 by Y-Y, and in FIG. 10 by Z-Z.

FIG. 11 shows a substantially rectangular cross section of a lubricating groove N.

FIG. 12 shows a substantially curved cross section of a lubricating groove N'.

FIG. 13 shows a substantially triangular cross section of a lubricating groove N".

In FIG. 11 to FIG. 13, respectively, the width of the lubricating groove is designated as A, and its depth is designated as T. The depth T is preferably between 0.1 and 1.5 mm.

The lubricating grooves N, N', N" can be produced either through a primary forming method during the production of the guide pads, for example, by compression and sintering, or they may be introduced into the sliding surface in a separate work step.

The illustrated cross-sectional shapes are only shown as examples here. All further possible cross-sectional shapes, also irregular or polygonal cross-sectional shapes, are possible in principle. The invention therefore also includes arbitrary designs of the lubricating grooves.

It was ascertained in experiments that a particularly significant improvement of the service life of the guide pads could be achieved if multiple lubricating grooves were introduced at an angle of both approximately 90° and also parallel to the longitudinal extension of the guide pad. In addition, improvements could also be achieved using lubricating grooves which were arranged at an angle of approximately 30° to the longitudinal direction of the guide pad.

In principle, improvements can also be achieved in that lubricating grooves are provided according to FIG. 9 and FIG. 10, whose extension in width and length is at least approximately equal. The lubricating grooves could accordingly be implemented as a circular or square depression in accordance with the top view in FIG. 10, the cross-sectional shape preferably being able to be implemented according to FIG. 11 to FIG. 13.

The invention claimed is:

1. A guide pad for a deep drilling tool, the guide pad having
    a length,
    a width smaller than the length,
    a height smaller than the length and smaller than the width, and
    at least one sliding surface across the length and the width and at a top of the height,
    wherein a first area of a contact zone of the at least one sliding surface consists of an area along a front sixth of the length of the guide pad and along the width starting inwards from opposite width edge regions of the at least one sliding surface,
    wherein a plurality of lubricating grooves are arranged in the first area of the contact zone of the at least one sliding surface; and
    wherein the lubricating grooves are implemented as closed pockets arranged in the at least one sliding surface of the guide pad, a first pocket and a second pocket of the closed pockets being disposed completely within the first area of the contact zone.

2. The guide pad according to claim 1, wherein the lubricating grooves have a length which approximately corresponds to their width.

\* \* \* \* \*